United States Patent
Utter

(10) Patent No.: US 8,669,203 B2
(45) Date of Patent: Mar. 11, 2014

(54) METHOD FOR FORMING PRODUCTS FROM A FLUE GAS DESULFURIZATION BY-PRODUCT AND PRODUCTS FORMED THEREBY

(71) Applicant: Utter Technology LLC, Bethel, OH (US)

(72) Inventor: Terry D. Utter, Bethel, OH (US)

(73) Assignee: Utter Technology LLC, Felicity, OH (US)

( * ) Notice: Subject to any disclaimer, the term of this patent is extended or adjusted under 35 U.S.C. 154(b) by 0 days.

(21) Appl. No.: 13/784,376

(22) Filed: Mar. 4, 2013

(65) Prior Publication Data

US 2013/0174625 A1    Jul. 11, 2013

Related U.S. Application Data

(60) Continuation of application No. 13/618,023, filed on Sep. 14, 2012, now Pat. No. 8,389,439, which is a division of application No. 12/130,150, filed on May 30, 2008, now Pat. No. 8,303,842.

(60) Provisional application No. 60/941,163, filed on May 31, 2007.

(51) Int. Cl.
*B01J 21/04*    (2006.01)

(52) U.S. Cl.
USPC ......................................... 502/439; 588/901

(58) Field of Classification Search
USPC ............... 588/249.5, 252, 901; 252/182.12, 252/182.32, 183.13, 183.14; 502/407, 439
See application file for complete search history.

(56) References Cited

U.S. PATENT DOCUMENTS

| | | |
|---|---|---|
| 3,785,840 A | 1/1974 | Minnick et al. |
| RE30,943 E | 5/1982 | Nicholson |
| 4,432,800 A | 2/1984 | Kneller et al. |
| 4,613,374 A | 9/1986 | Smith |
| 4,624,711 A | 11/1986 | Styron |
| 4,722,866 A | 2/1988 | Wilson et al. |
| 4,756,761 A | 7/1988 | Philip et al. |
| 5,185,039 A | 2/1993 | Hamaguchi et al. |
| 5,211,750 A | 5/1993 | Smith et al. |
| 5,366,548 A | 11/1994 | Riddle |
| 5,534,058 A | 7/1996 | Strabala |
| 5,554,352 A | 9/1996 | Jaques et al. |
| 5,622,556 A | 4/1997 | Shulman |
| 5,628,811 A | 5/1997 | College et al. |
| 5,704,972 A | 1/1998 | Ivkovich |
| 5,766,339 A | 6/1998 | Babu et al. |
| 5,769,940 A | 6/1998 | College |
| 5,935,885 A | 8/1999 | Hnat et al. |
| 5,980,627 A | 11/1999 | Marcoux et al. |
| 6,197,200 B1 | 3/2001 | College et al. |
| 6,200,379 B1 | 3/2001 | Strabala |
| 6,331,207 B1 | 12/2001 | Gebhardt |
| 6,786,966 B1 | 9/2004 | Johnson et al. |
| 6,808,562 B2 | 10/2004 | Bland |
| 8,389,439 B2 * | 3/2013 | Utter .............................. 502/439 |
| 2001/0002386 A1 | 5/2001 | Steele et al. |

FOREIGN PATENT DOCUMENTS

| | | |
|---|---|---|
| CH | 683400 A5 | 3/1994 |
| DE | 3633027 A1 | 6/1988 |
| DE | 4119504 A1 | 12/1992 |
| DE | 19638960 A1 | 3/1998 |
| EP | 0094363 A1 | 11/1983 |
| EP | 0355507 A1 | 2/1990 |
| EP | 0478492 A2 | 4/1992 |
| EP | 0486932 A1 | 5/1992 |
| EP | 0537694 A1 | 4/1993 |
| EP | 0707056 A1 | 4/1996 |
| GB | 2084985 A | 4/1982 |
| WO | 8200819 A1 | 3/1982 |

OTHER PUBLICATIONS

Airpol Inc. and the U.S. Department of Energy, Clean Coal Technology, "SO2 Removal Using Gas Suspension Absorption Technology," pp. 1-26, Apr. 1995.

EPA, Air Pollution Control Technology Fact Sheet, "Flue Gas Desulfurization (FGD)—Wet, Spray Dry, and Dry Scrubbers," EPA-452/F-03-034, pp. 1-6, 2003.

Debra F. Pfughoeft-Hasset, Energy & Environmental Research Center, Quarterly Technical Report, "Mercury and Air Toxic Element Impacts of Coal Combustion By-Product Disposal and Utilization," 18 pp, Jul. 2006.

Beatty, et al. "Mineralogical Associations of Mercury Retained in FGD Gypsum," U.S. Department of Energy, 1 p, 2006.

(Continued)

*Primary Examiner* — Edward Johnson

(74) *Attorney, Agent, or Firm* — Wood, Herron & Evans LLP

(57) ABSTRACT

Compositions and methods for producing a manufactured product, a method for making a liquid absorbent, and processes for disposal of flammable liquids with a flue gas desulfurization by-product. The compositions for the manufactured products combine a binder and the by-product. The composition contains a greater percentage by weight of the by-product than the binder. The methods for producing manufactured products include dewatering the gypsum-depleted waste stream to reduce a water content, and forming the manufactured product. The method for making a liquid absorbent includes dewatering, granulating, drying, heating, and packaging a granulated gypsum-depleted composition as the liquid absorbent. The processes for disposal of flammable liquids include distributing a by-product into contact with flammable liquid, absorbing the liquid, transporting, and igniting the flammable liquid. The artificial soils are a combination of by-product and animal waste.

10 Claims, 6 Drawing Sheets

(56) References Cited

OTHER PUBLICATIONS

"ACAA Fly Ash Basics," Ash at Work, Issue 1, p. 40, 2006.
E. Cheri Miller, "The Future of FGD GYPSUM," Ash at Work, pp. 29, 30, Summer/Fall 2005.
Ramsier et al., "A Win/Win Solution for FGD-GYMPSUM: Researchers Discover Beneficial Applications for By-Product in Agriculture," Ash at Work, Issue 1, pp. 10, 11 and 14, 15, 2006.
Jorgenson et al., "Reuse and Disposal Working Together: A Hybrid Approach to CCP Management," Ash at Work, Issue 1, pp. 16, 17 and 20, 2006.
Gypsum Association, "Fire Resistance Provided by Gypsum Board Membrane Protection," (GA-610-02), 2 pp, 2002.
Cline et al., Babcock & Wilcox, "Kepco's First 5000 MW of Flue Gas Desulfurisation," 6 pp, 1998.
Poon, et al., "Effects of Flue Gas Desulphurization Sludge on the Pozzolanic Reaction of Reject-Fly-Ash-Blended Cement Pastes," Cement and Concrete Research 34 (2004) 1907-1918.
Yazici, "Utilization of Coal Combustion Byproducts in Building Blocks," Fuel 86 (2007) 929-937.
Qiao, et al., Use of Flue Gas Desulphurisation (FGD) Waste and Rejected Fly Ash in Waste Stabilization/Solidification Systems, Waste Management 26 (2006) 141-149.
Bigham, et al., "Mineralogical and Engineering Characteristics of Dry Flue Gas Desulfurization Products," Fuel 84 (2005) 1839-1848.
European Patent Office, Partial International Search Report issued in corresponding PCT Application Serial No. PCT/US2008/006840 dated Oct. 21, 2008 (2 pages).
European Patent Office, International Search Report issued in corresponding PCT Application Serial No. PCT/US2008/006840 dated Mar. 23, 2009.
Laperche, et al., "Quantitative, Chemical, and Mineralogical Characterization of Flue Gas Desulfurization By-Products," J. Environ. Qual. 31:979-988 (2002).
Mallon, "REA-Gips—Technische and wirtschaftliche Aspekte eines Sekundarrohstoffs, Teil 1," 51 Jahrgang Nr. Apr. 1998—SKG International.
Mulhern, D.W., et al., "Vegetation of Waste Disposal Areas at a Coal-Fired Power Plant in Kansas," J. Environ. Qual. vol. 18, Jul.-Sep. 1989, pp. 285-292.

\* cited by examiner

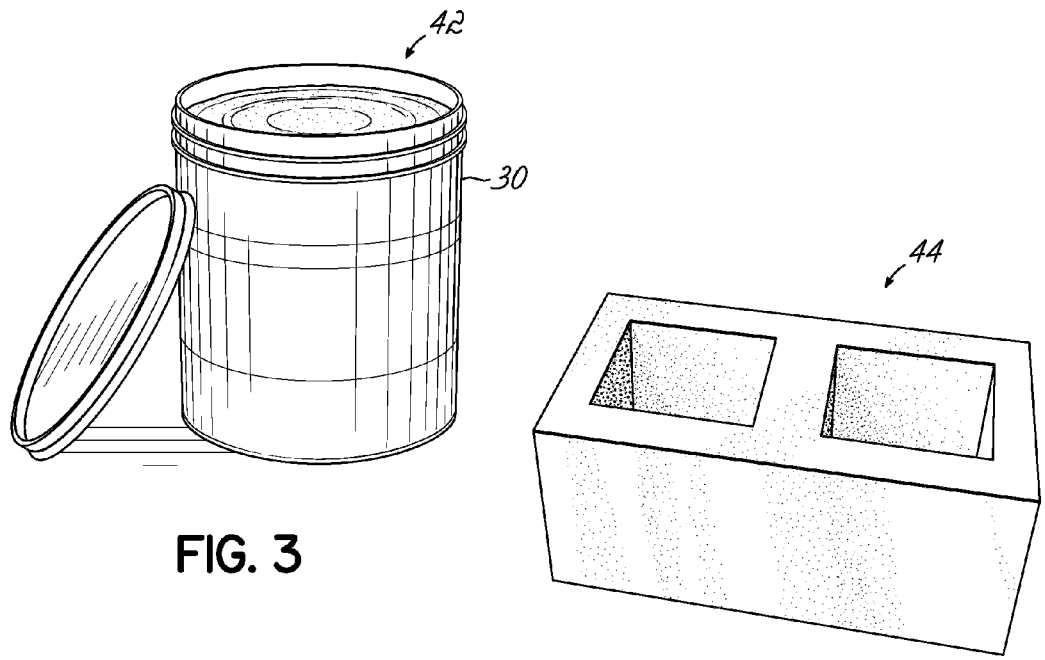
FIG. 3
FIG. 5
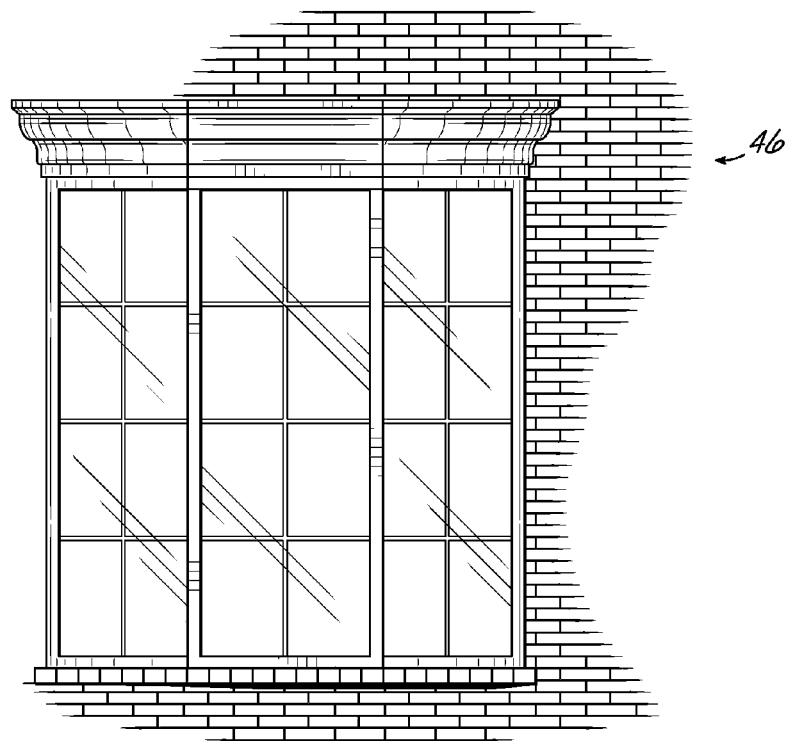
FIG. 6

METHOD FOR FORMING PRODUCTS FROM A FLUE GAS DESULFURIZATION BY-PRODUCT AND PRODUCTS FORMED THEREBY

CROSS REFERENCE TO RELATED APPLICATIONS

This application is a continuation of U.S. patent application Ser. No. 13/618,023 filed Sep. 14, 2012 (now U.S. Pat. No. 8,389,439), which is a divisional of U.S. patent application Ser. No. 12/130,150 filed May 30, 2008 (now U.S. Pat. No. 8,303,842), which claims the benefit of U.S. Provisional Patent Application Ser. No. 60/941,163, filed May 31, 2007, the disclosures of which are hereby incorporated by reference herein in their entirety.

FIELD OF THE INVENTION

This invention relates to products, including flame retardant products, and methods for forming products from flue gas desulfurization waste.

BACKGROUND OF THE INVENTION

One of the many emissions from fossil fuel power generation is sulfur dioxide. The sulfur in the sulfur dioxide originates as an impurity in many fossil fuels, particularly coal. Sulfur dioxide is a combustion product formed by reacting sulfur in the fuel with oxygen. Current environmental regulations require industry to reduce emissions of sulfur dioxide because it is a source of acid rain. Accordingly, the power generation industry has adopted technologies to "scrub" the sulfur dioxide from effluent combustion gases. These technologies are referred to as flue gas desulfurization (FGD) technologies. In brief, FGD technology is used to at least partially remove sulfur dioxide from combustion gas in a coal burning power plant by injecting a slurry comprising water and a lime or limestone material into a combustion gas exhaust stream. The lime or limestone reacts with the sulfur dioxide to produce solids comprising compounds containing calcium and sulfur. Subsequent reaction of these compounds with oxygen produces calcium sulfate or gypsum and residual waste materials. Often gypsum is removed and sold while leaving a waste stream that is usually landfilled.

For example, in a wet scrubbing FGD process, the limestone is pulverized and is added to water to form a slurry. The slurry is injected into an absorber through which the combustion gas exhaust stream flows. The limestone in the slurry reacts with the sulfur dioxide in the combustion gas forming a compound containing calcium and sulfur. Once the slurry passes through the absorber, the slurry returns to a water treatment process.

The water treatment process has many purposes. One purpose is to oxidize any calcium sulfite to calcium sulfate. Compressed air and sulfuric acid are added to the slurry at temperatures of between about 130° F. and about 150° F. to oxidize any calcium sulfite present. The calcium sulfate is removed from the water by filtering, such as with hydrocyclones and dewatering belts. The water is further treated, as described below, for reuse. The calcium sulfate, in a hydrated form known as gypsum, may be sold to drywall manufacturers.

Besides the gypsum, the FGD process produces a waste stream comprising fine, unsettled particles. Additional treatment of the water following removal of gypsum is required to remove the fine, unsettled particles. A secondary water treatment process includes addition of various polymers, which facilitate flocculation and settling of the particles. The fine, unsettled particles and polymers are then pumped into a settling tank or clarifier where the particles flocculate and then settle due to gravity. Other additives may include biocides to control the bacteria content. Once the flocculated particles settle, they are pumped through an additional dewatering step. After dewatering, the settled particles appear as an orange, paste-like sludge. Gypsum, by contrast, is a pure white material. The sludge is often referred to as OFS (orange fluffy stuff). The OFS is a waste product, or by-product, of the FGD process following removal of commercially pure gypsum. Typically, the OFS is landfilled.

The demand for electrical power is increasing. As the consumption of coal increases, the volume of the FGD waste stream (i.e. OFS) also increases. What are needed are methods and products for turning OFS into viable products.

SUMMARY OF THE INVENTION

According to one embodiment of the present invention, in one embodiment, a composition for producing a manufactured product is provided. The composition comprises a binder and a by-product from a flue gas desulfurization process combined with the binder. The by-product is composed of gypsum, a silicon-containing compound, and a magnesium-containing compound, wherein the composition contains a greater percentage by weight of the by-product than the binder. In one embodiment, the binder is composed of a clay and the manufactured product is drywall joint compound. In another embodiment, the binder is composed of a hydraulic cement, and the manufactured product is a brick, a brick veneer, or manufactured stone. In another embodiment, the binder is composed of a hydraulic cement, and the manufactured product is a sheet of drywall.

In accordance with another embodiment of the invention, a method of making a manufactured product using a waste stream from a flue gas desulfurization process is provided. The waste stream has been depleted of gypsum so that the waste stream is enriched in a by-product. The method comprises dewatering the gypsum-depleted waste stream to reduce a water content thereof, and forming the manufactured product using the by-product contained in the dewatered, gypsum-depleted waste stream.

According to another embodiment of the invention, a method for making a liquid absorbent from a waste stream of a flue gas desulfurization process follows removing a majority of gypsum from the waste stream. In one embodiment, the method comprises dewatering the waste stream to form a gypsum-depleted composition containing a by-product, granulating the gypsum-depleted composition, drying the granulated gypsum-depleted composition at a first temperature, heating the granulated gypsum-depleted composition to a second temperature hotter than the first temperature to react constituents of the granulated gypsum-depleted composition, and packaging the reacted, granulated gypsum-depleted composition as the liquid absorbent.

In yet another embodiment, a process for disposal of a flammable liquid is provided. The process comprises distributing a by-product from a flue gas desulfurization waste stream into contact with the flammable liquid, absorbing the contacted flammable liquid with the by-product, transporting the by-product and the absorbed flammable liquid to a controlled environment, and igniting the flammable liquid to substantially remove the flammable liquid from the by-product as combustion products.

In yet another embodiment, an artificial soil is provided. The artificial soil comprises a by-product from a flue gas desulfurization process, the by-product composed of gypsum, a silicon-containing compound, and a magnesium-containing compound; and animal waste combined with the by-product.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 3 is a perspective view of drywall joint compound according to one embodiment of a manufactured product of the present invention;

FIG. 5 is a perspective view of a brick veneer according to one embodiment of the manufactured product of the present invention;

FIG. 6 is a perspective view of a manufactured stone according to one embodiment of the manufactured product of the present invention;

DETAILED DESCRIPTION

Figure 1:
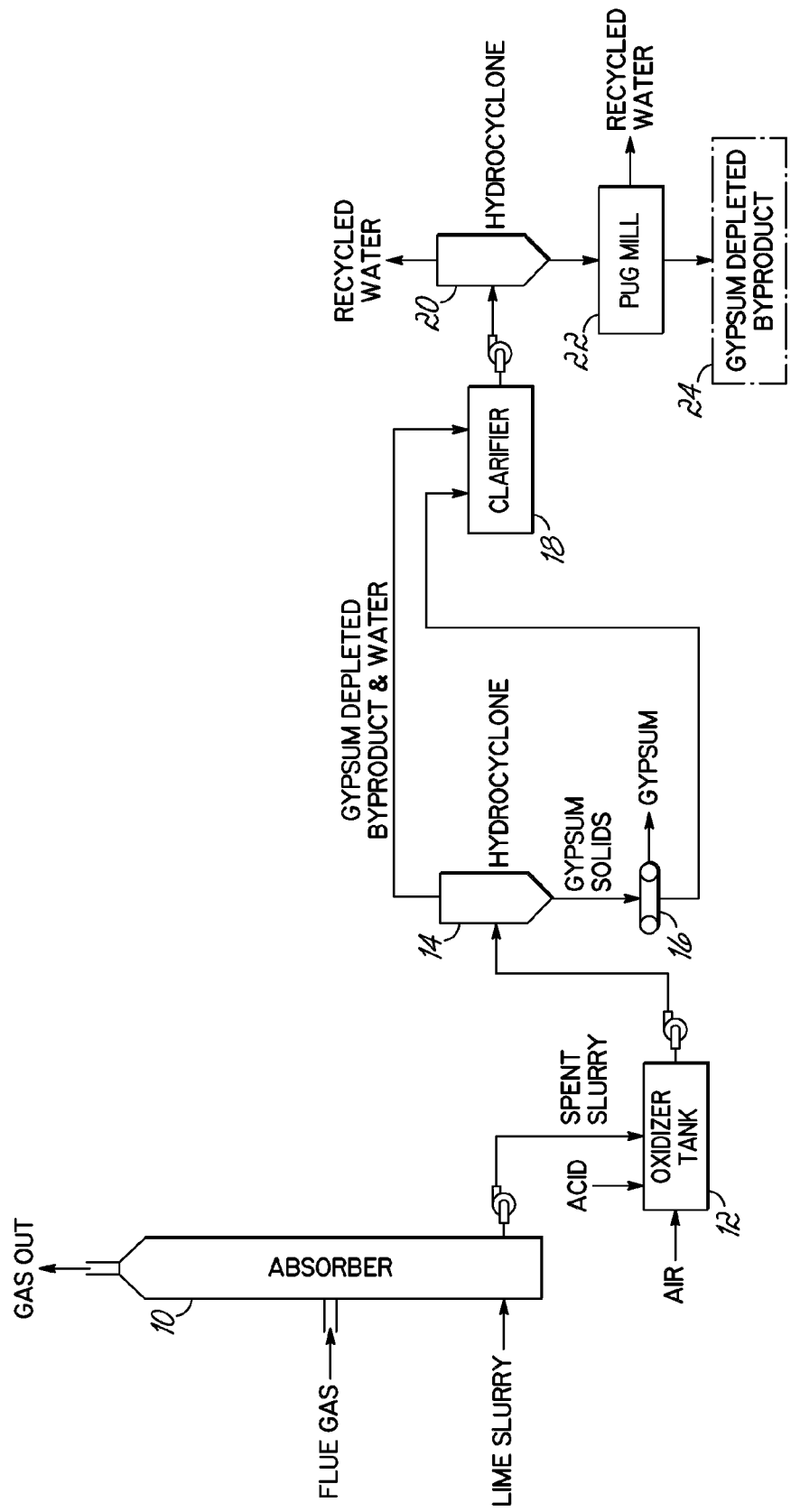
FIG. 1 is an schematic representation of a flue gas desulfurization process.

An example of a FGD process is illustrated in FIG. 1. One skilled in the art will recognize that other FGD processes will have similar waste streams as that described herein. Therefore, the embodiments shown and described herein are not limited to the FGD process depicted in FIG. 1. One skilled in the art will also observe that the FGD process illustrated is just one portion of a coal burning power plant or other fossil fuel burning power generation facility.

As shown in FIG. 1, a liquid slurry containing a calcium-containing compound is injected into an absorber 10. During normal operation, flue gas from, for example, burning coal to generate electricity also flows through the absorber 10. The calcium-containing compounds react with a majority of the gaseous sulfur dioxide in the flue gas forming calcium sulfate/sulfite. The gaseous sulfur is, therefore, substantially removed from the flue gas, which subsequently passes from the absorber 10. The used liquid slurry is then directed to an oxidizer tank 12 where any sulfites are oxidized to sulfates most likely by addition of compressed air and sulfuric acid. The oxidized, used liquid slurry is then passed through a hydrocyclone 14 to separate the majority of the solids from the liquid. In this case, the solids are directed to another dewatering device 16 (vista belts). Between the two dewatering steps, gypsum is removed from the used liquid slurry. The gypsum-depleted, used liquid slurry then passes to a clarifier 18 where a by-product is allowed to settle. Various additives may be added to facilitate settling thereof. Following settling, another hydrocyclone 20, and possibly another dewatering device 22, separates the by-product 24 from the liquid.

Figure 2:
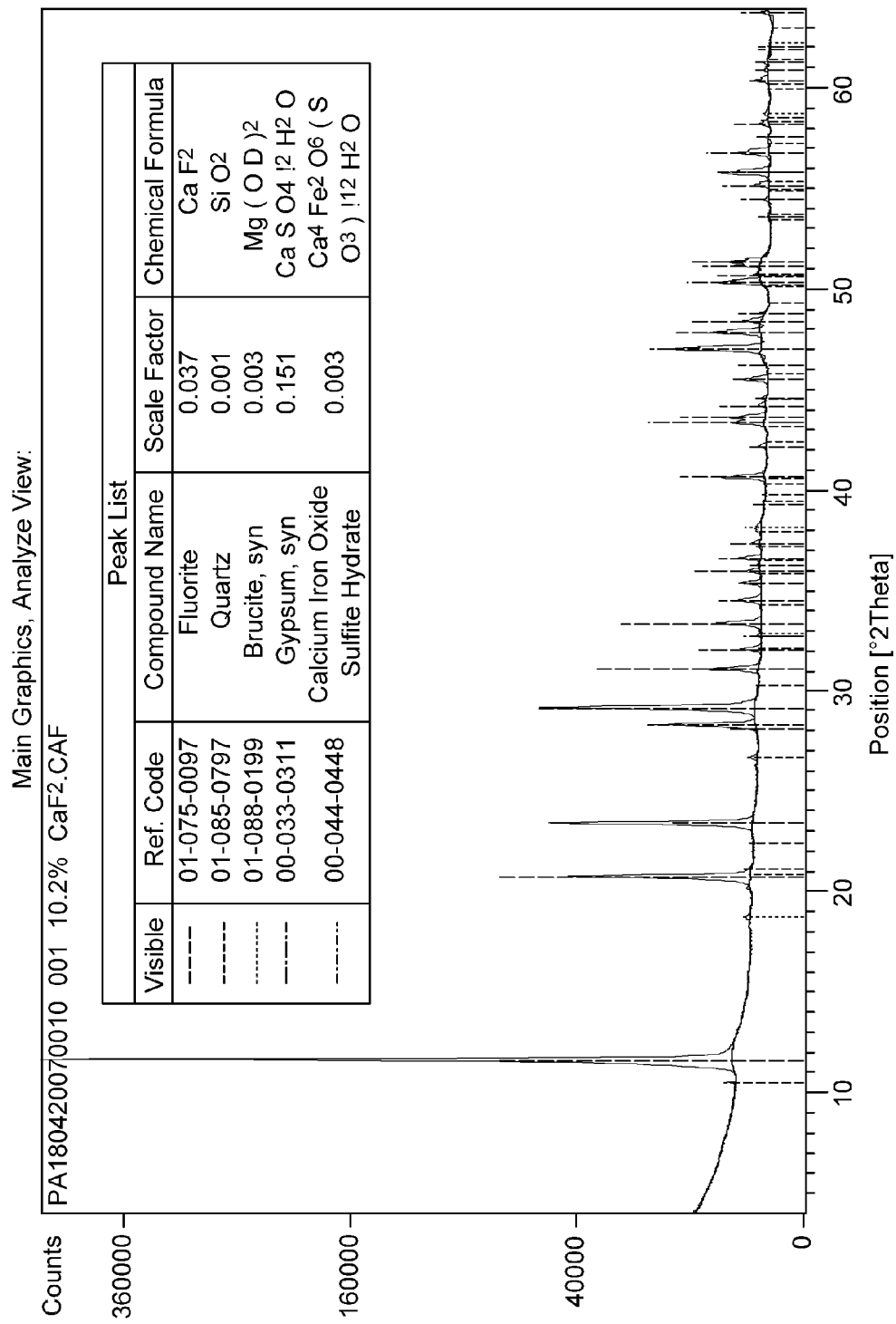
FIG. 2 is an x-ray diffraction pattern of one sample of a gypsum-depleted by-product from a flue gas desulfurization process.

FIG. 2 illustrates an example of an x-ray diffraction pattern of a dried sample of the by-product 24 of FIG. 1. The dried sample of the by-product was analyzed using a PANalytical X'pert Pro diffractometer using copper x-rays. As shown in FIG. 2, the x-ray diffraction pattern depicts that the dried by-product is composed of major constituents of gypsum $(CaSO_4.2H_2O)$; a silicon-containing compound, in this case quartz $(SiO_2)$; and a magnesium-containing compound, in this case brucite $(Mg(OH)_2)$. While FIG. 2 depicts the by-product as composed of gypsum, quartz, and brucite, other silicon-containing and magnesium-containing compounds may be observed depending on the conditions at the power generation facility, as set out below.

TABLE 1A lists an equivalent oxide analysis of the constituents of a representative sample of the by-product. The equivalent oxide analysis was determined with atomic absorption analysis as is known in the art. By comparison, TABLE 1B lists the equivalent oxide constituents for representative FGD gypsum sold to dry-wall manufacturers.

TABLE 1A

| PRIMARY COMPOSITION | (%) |
| --- | --- |
| Loss on Ignition LOI | 12 |
| Sulfate, $SO_3$ | 39 |
| Calcium, CaO | 25 |
| Silicon, $SiO_2$ | 8 |
| Magnesium, MgO | 11 |
| Aluminum, $Al_2O_3$ | 2 |
| Choride, Cl— | 1 |
| Iron, $Fe_2O_3$ | 1 |
| Fluoride, F— | 1 |

TABLE 1B

| PRIMARY COMPOSITION | (%) |
| --- | --- |
| Sulfate, $SO_3$ | 53 |
| Calcium, CaO | 39 |
| Loss on Ignition LOI | 7 |
| Silicon, $SiO_2$ | 1 |

One skilled in the art will observe that the composition and relative proportions of the major constituents of the by-product may depend on the source of the limestone, or lime, used in the FGD process; the impurities in the coal; and other impurities and additives from the power generation and the water treatment processes. Some variability in the relative proportions of the constituents is, therefore, expected. As evidenced by FIG. 2, the by-product is substantially free of calcium sulfite, however, calcium sulfate, silica, and brucite as well as other calcium-containing compounds (e.g., $CaF_2$ and $Ca_4Fe_2O_6(SO_3).12H_2O$) exist in detectable quantities. Based on the x-ray diffraction pattern and the following tables, in one embodiment, the dried by-product comprises less than about 75 wt. % gypsum, and, in another embodiment, the dried by-product comprises less than about 50 wt. % gypsum. In contrast, gypsum used in commercial applications is more than 96 wt. % pure.

Also, the by-product is composed of particles generally having diameters of less than 50 microns. In particular, $d_{90}$ of less than 40 microns with $d_{50}$ of between about 3 to about 7 microns and $d_{10}$ of about 3 microns or less. The $d_{90}$, $d_{50}$, and $d_{10}$, represent particle size diameters below which 90%, 50%, and 10% of the cumulative particle size distribution occurs, respectively.

The embodiments of the present invention result from the discovery that the by-product has unexpected properties. In addition, applicant has realized that the by-product is readily mixable or combinable with other materials and that the mixtures may be made into products. One advantage of using the by-product is that the cost of the manufactured product is reduced. Another advantage is that the by-product enhances the properties of the manufactured product beyond what one skilled in the art would predict. For example, as discussed below, manufactured products composed of the by-product have an unexpected resistance to flame compared to gypsum products.

According to one embodiment of the present invention, a composition for producing a manufactured product comprises a binder combined with a greater percentage by weight of the by-product. That is, the mixture is at least 50 wt. % by-product and balance binder. In another embodiment, the mixture is at least 80 wt. % by-product and balance binder. Additional water may be added depending upon the application. For example, an additional amount of water (about 10 wt. %) is added to the mixture to make a slurry. In other embodiments, additional water may not be required for subsequent processing.

In one embodiment, the binder is a clay, such as bentonite, montmorillonite, or natural or synthetic aluminosilicate. The by-product may be mixed with the clay to form a plastic, clay-like body. The clay-like body may be formed into products with techniques known in the art of clay forming, such as extrusion, jiggering, and casting. Therefore, these mixtures may be used to make any products normally made with clay, such as bricks.

With reference to FIG. 3, the clay mixture may be packaged for direct consumer use rather than for making products. For example, a mixture of the clay binder, the by-product, and water has properties similar to wall repair compounds such as joint compound 42. The joint compound 42 is used to fill seams or joints defined between the abutting edges of adjacent wallboard panels, such as gypsum drywall or wallboard panels, used to construct the interior walls of residential and commercial buildings. The joint compound 42 may include additional additives, such as thickeners and other agents apparent to a person having ordinary skill in the art.

As shown in FIG. 3, the joint compound 42 may, therefore, be packaged by placing it in a container, like a bucket 30, for direct commercial sale to a consumer and subsequent use by the consumer. The joint compound 42 is applied from the bucket 30 directly to the wallboard joints using a trowel or the like. A fiberglass, cloth, or paper reinforcing tape material may be embedded within the wet joint compound 42. After the joint compound 42 hardens, a second layer of the joint compound 42 is applied over the joint and reinforcing tape to completely fill the joint and to more fully conceal the joint to create a smooth seamless wall surface. After the second layer of the joint compound 42 hardens, the joint compound 42 may be sanded smooth to reduce surface irregularities. Paint or a wall covering, such as wall paper, can then be conventionally applied over the joint compound 42 so that the joint and the drywall compound are imperceptible under the paint or wall covering.

Alternatively, the joint compound 42 may also be used as a spackling compound and the like to repair other types of imperfections in walls so as to impart a continuously smooth appearance to the wall surface. For example, the joint compound 42 may be used to conceal defects caused by the nails or screws used to affix the wallboard panels to the studs.

Figure 4:
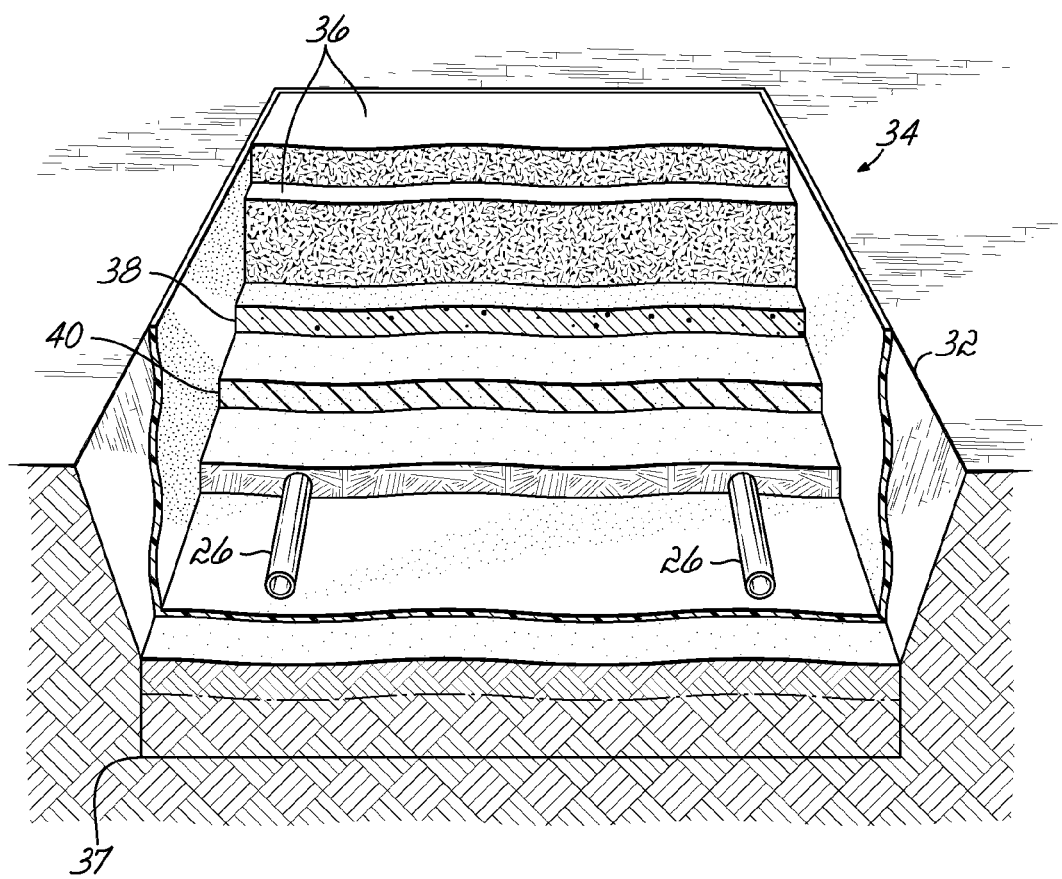
FIG. 4 is a perspective view of a brick according to one embodiment of the manufactured product of the present invention.
Figure 7:
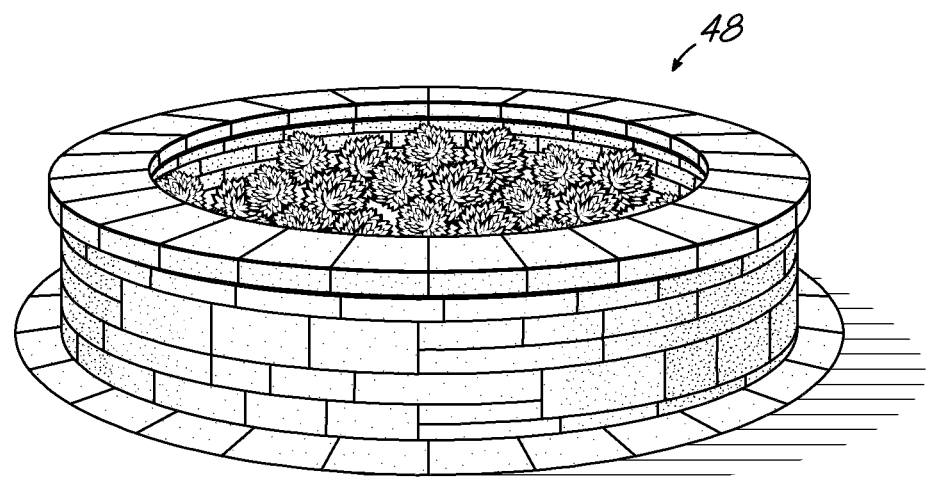
FIG. 7 is a perspective view of a sheet of drywall according to one embodiment of the manufactured product of the present invention.
Figure 8:
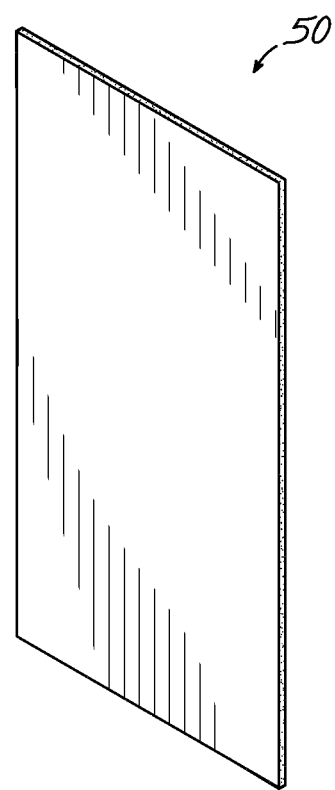
FIG. 8 is a partial cross-sectional perspective view of a landfill having a landfill liner according to one embodiment of the manufactured product of the present invention.

In one exemplary embodiment and as illustrated in FIG. 4, the binder is a bentonite, or another type of processed clay, and the manufactured product is a landfill liner 32. In a representative embodiment, the binder may be sodium bentonite, which is a naturally occurring compound in a silicate clay formed from volcanic ash.

A solid waste landfill 34 is depicted in FIG. 4. The landfill 34, as is known in the art, is constructed to prevent permeation of liquids from landfill waste material 36 into the water table 37 by capturing any liquid passing through drainage layers 38, 40 with the liner 32 and draining the captured liquid from the landfill 34 through the drainage pipes 26. To that end, in the prior art, the landfill 34 is constructed with a liner of compacted clay and a plastic liner.

According to one embodiment of the manufactured product, a mixture of the by-product with sodium bentonite in the range of about 4 wt. % to about 20 wt. % sodium bentonite (about 1 lb. (about 0.45 kilogram) of by-product to about 0.25 lb. (about 0.11 kilogram) bentonite) is pliable and substantially impermeable. The mixture, however, may contain as much as about 50 wt. % sodium bentonite depending on the desired cost of the landfill liner 32. In any case, the liner 32 composed of the by-product and the sodium bentonite may replace the compacted clay liner of the prior art. The mixture may perform as well as, or better than, the commercially available liners by substantially preventing liquid permeation through the liner 32. The liner 32, however, may cost a fraction of the cost of conventional liners, such as high density polyurethane (HDPE) sheeting.

In addition, the liner 32 may provide equivalent liquid permeability at reduced thicknesses. For example, standard liner thicknesses are at least 36 inches (91 centimeters) of compacted clay. The mixture of by-product and bentonite layered to a thickness of about 6 to about 12 inches (about 15 to about 30 centimeters) may have similar liquid permeability or hydraulic conductivity as a conventional landfill liner composition that is 36 inches (91 centimeters) thick. Additional applications may include forming liners for farm ponds and the like. Alternatively, the liner 32 may be a composite structure that includes a layer of the mixture of the by-product and sodium bentonite clad between sheets, or similar substrates, such as geotextiles.

In yet another embodiment, the by-product may be combined with other types of binders like any one of various types of hydraulic cements, for example Portland cement. For example, a mixture composed of Portland cement and by-product may be made into a variety of manufactured products depending on the process used, as will be described below.

With reference to FIGS. 5, 6, 7, and 8, by way of examples only and not limitation, the manufactured products may include brick 44 or block, brick veneer 46, stepping or manufactured stone 48, and a sheet of dry wall 50, respectively, and other structural elements apparent to a person having ordinary skill in the art. The construction of brick 44, brick veneer 46, manufactured stone 48, and dry wall sheets or wallboard panels 50 is known to a person having ordinary skill in the art, as well as the process for making these and other types of manufactured products. The mixture of Portland cement and by-product may also be gunned onto support structures for improved fire resistance (not shown). Bricks 44, brick veneer 46, and manufactured stone 48 are commonly installed on houses, commercial buildings, and other structures to provide environmental protection, structural support, and attractive exterior surfaces. Wallboard panels 50 are used to construct the interior walls of residential and commercial buildings. The wallboard panels 50 are attached to the building studs using nails or other conventional fasteners.

Optionally, additional constituents may be added to the mixture of hydraulic cement and the by-product used to make the bricks 44, brick veneer 46, and manufactured stone 48. These additional constituents may include, for example, glass fiber reinforcement, gypsum, and flyash and/or bottom ash from a coal burning power plant. The presence of these additional constituents may improve the mechanical properties of the manufactured product.

As briefly described above, the by-product may exhibit exceptional resistance to fire. The abovementioned manufactured products containing the by-product are damage resistant when exposed to an open flame. That is, the manufactured product and the by-product itself do not discolor, spall, flake, or deform in any discernible manner, when exposed to open flame at temperatures in excess of 1832° F. (1000° C.). In addition, once removed from the flames, the manufactured product or the by-product alone is unexpectedly touchable without injury or sensation of pain. Hence, the manufactured product has a low thermal conductivity.

Figure 9:
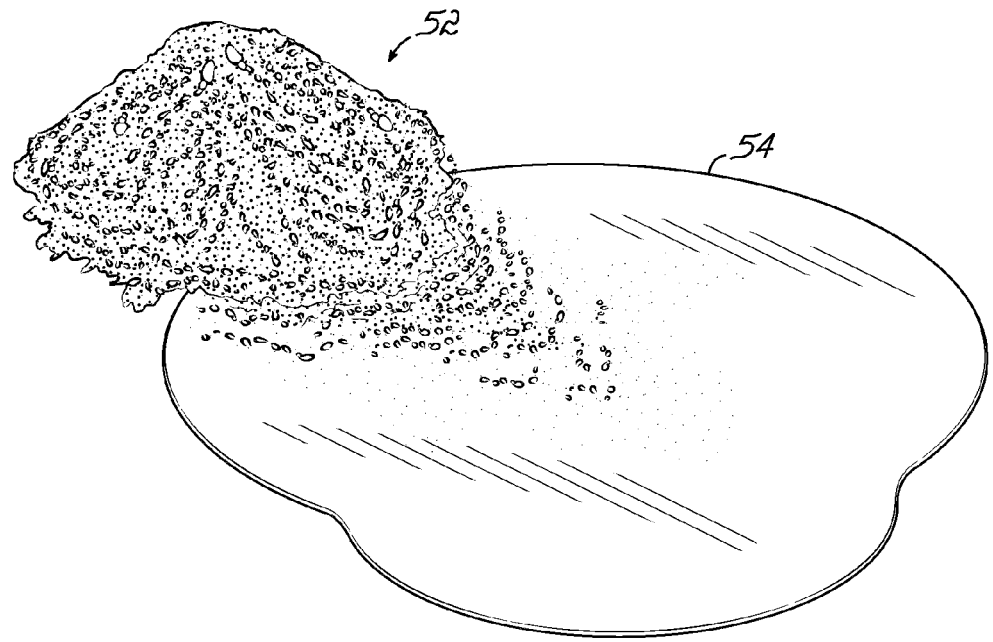
FIG. 9 is a perspective view of a liquid absorbent according to one embodiment of the manufactured product of the present invention.

Furthermore, in another embodiment and with reference to FIG. 9, agglomerates 52 of the by-product will absorb and retain a large volume of liquid 54. Because the products composed of the by-product are fire resistant, agglomerates 52 or other bulk products consisting essentially of dried by-product are uniquely suited for use as a liquid absorbent 52, particularly for absorbing flammable liquids 54 such as hydrocarbons like fuels, oils, solvents, thinners, etc.

For example, dry agglomerate of the by-product will increase in weight by about 50% by absorbing gasoline or diesel fuel oil. After absorbing a flammable liquid 54, the flammable liquid 54 contained within the by-product may be disposed of by igniting the flammable liquid 54. The by-product remains unchanged and may be recovered and reused to absorb another amount of flammable liquid. Therefore, the liquid absorbent 52 may be used to absorb accidental fuel spills. The liquid absorbent 52 holds the flammable liquid and will not release any significant amount into the surrounding environment. The absorbent/fuel mixture may then be transported to a safe location, where the fuel may be ignited or otherwise disposed of in a safe manner.

Figure 10:
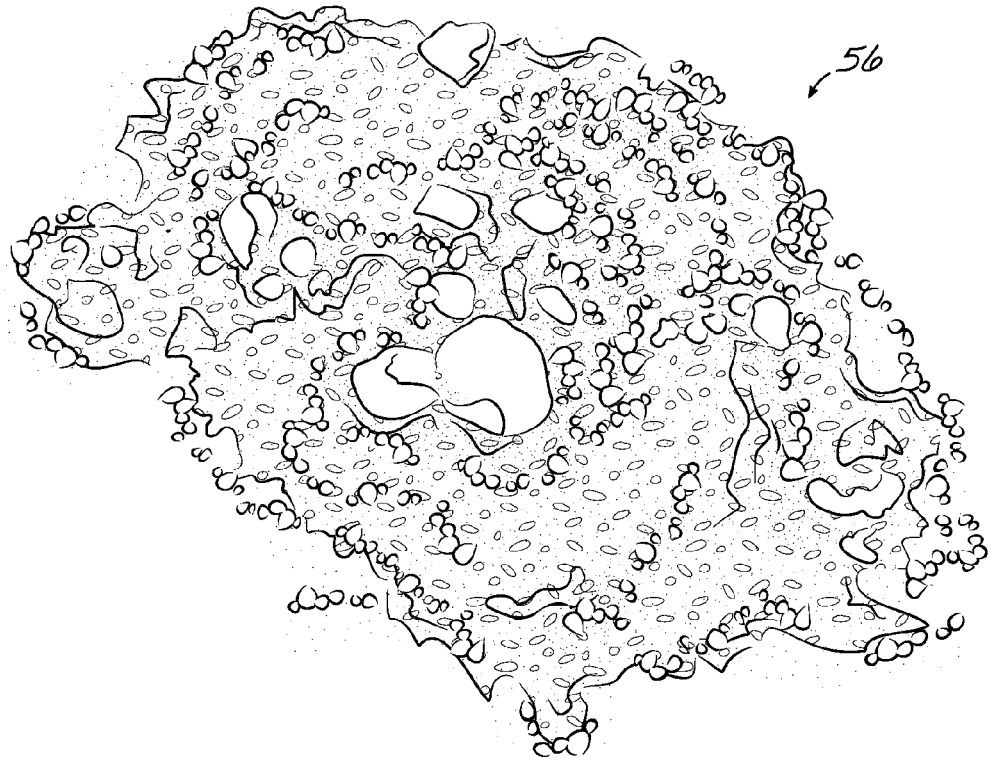
FIG. 10 is a perspective view of artificial soil according to one embodiment of the manufactured product of the present invention.

According to another embodiment of the present invention, an artificial soil 56 comprises a combination of the by-product and animal waste or excrement, as shown in FIG. 10, such as feces, urine, and other bio-solids. The artificial soil 56 may be distributed in a location where there is a lack of topsoil, such as un-remediated strip mines and along roadways. Furthermore, grass has been observed to grow exceptionally well in the artificial soil 56. In one particular embodiment, the animal waste and the by-product are present in about volumetrically equal amounts. In yet another embodiment, the artificial soil 56 further comprises about 10 vol. % hydrated lime to reduce offensive odors. As an alternative to the lime addition, the artificial soil 56 may be thermally treated or composted. Additional additives, such as fertilizers, may be added to the content of the artificial soil 56.

According to yet another embodiment of the present invention, a method of making manufactured products comprises dewatering of the gypsum-depleted by-product and forming the manufactured product using the dewatered by-product. By way of example, a centrifuge and/or a pug mill may be used to reduce the water content of the by-product. Following dewatering, the by-product is less than about 50 wt. % water, and may be preferably less than about 30 wt. % water depending on the by-product content and the device used for dewatering. While less water is preferable for transportation and handling purposes, some water prevents dusting and may facilitate mixing the by-product with other materials.

In one specific embodiment, forming comprises mixing the by-product with a binder and fabricating the manufactured product from the mixture. Any one of the binders set forth above may be mixed with the by-product. Furthermore, forming the manufactured product may include pressing the by-product. For example, a mixture of Portland cement and the by-product may be formed into products by pressing. The mixture may be pressed into a mold (not shown) with a cavity shaped to reflect a shape of the manufactured product. By way of example, the manufactured products include the brick 44, brick veneer 46, manufactured stone 48, or drywall sheet 50. Pressing may be facilitated with a hydraulic press or other forming techniques known in the art. In one embodiment, the mixture is pressed by hand into a block form. Once pressed, the resulting manufactured product is allowed to set until hard and dry.

Alternatively, fabricating may include placing or pouring the dewatered by-product into a mold. The by-product sets and dries resulting in a product that substantially conforms to the mold. The poured products have uses similar to commercially available bricks 44, blocks of all sizes, brick veneers 46, manufactured stone 48, and/or drywall sheet 50 used in architectural, building, construction, and other structural and non-structural applications. However, the material cost of the products is less than the commercially available components. In addition, the products pressed from a mixture of the by-product may be lighter than comparable commercially available products.

The method may further include heating the product to temperatures of at least about 365° F. (185° C.). Following heating, the products, for example, bricks, exhibit improved mechanical integrity. For example, the products formed from a mixture of Portland cement and by-product will receive drywall screws without cracking such that when the screws are inserted with a cordless drill, the drill stalls before the drywall screws strip out.

In another embodiment, a mixture of the dried by-product and Portland cement may be heated to at least about 365° F. (about 190° C.) for about 2 hours and bagged. Later use of the mixture may include pouring or pumping the dry mixture to a desired location. Once positioned, water is added to the mixture. In one embodiment, between about 5 wt. % and 30 wt. % water is added to the mixture. In another embodiment, a quantity of water is added to the mixture in excess of 30 wt. % without degradation in properties. The water causes the mixture to harden. Mixing of the water with the mixture is not required. Thus, for example, the mixture may be distributed or pumped to a location, such as for industrial grouting, for supporting machinery, and for shoring up equipment pads and other concrete structures. Once exposed to water the mixture hardens but does not shrink. Other applications include those similar to where hydraulic grouts and mortars are used. An aggregate, such as washed #57 stone (0.25 inch (0.64 centimeter) to 0.75 inch (1.9 centimeters) diameter washed aggregate), may be mixed into the mixture for additional structural strength. Generally, about 20 wt. % aggregate is added to the mixture. However, the weight percent aggregate may be from about 5 wt. % to about 30 wt. %.

Similarly, a method for making a liquid absorbent 52 comprises dewatering the by-product, granulating the dewatered by-product, and drying the granulated by-product. Once dried, the granulated by-product is heated to a temperature of at least 365° F. to react the constituents. Not wishing to be by theory, the reaction may include loss of chemically bound water and/or reaction between the constituents within the by-product. The reacted by-product is then packaged for use as a liquid absorbent 52.

In order to facilitate a more complete understanding of the invention, the following non-limiting examples are provided.

Example 1

In this example, one five-gallon bucket of the by-product was mixed with about 4 wt. % bentonite. In terms of weight, one five-gallon bucket of the by-product taken directly from a centrifuge (contains about 30 wt. % water) is about 55 lbs. (about 25 kg). Water was added to the mixture. The consistency was similar to that of drywall joint compound. The mixture was applied to a surface of a sheet of drywall and, after drying, the material sanded like a commercially available joint compound.

Example 2

In this example, one five-gallon bucket of the by-product (about 55 lbs. (about 25 kg)) was mixed with one five-gallon bucket of clay (about 55 lbs. (about 25 kg)), in this case bentonite, in a cement mixer. About 5 wt. % water was added to the mixture. The final mixture had plasticity similar to that of clay and may be suitable for use as a landfill liner.

Example 3

In this example, one five-gallon bucket of gypsum was mixed with one five-gallon bucket of the by-product and with one-half of a five-gallon bucket of Portland cement together with a colorant. One-half of a five-gallon bucket of Portland cement weighs about 25 lbs. (about 11 kg). Following mixing in the cement mixer, the mixture was poured into a block form. A similar mixture, but one having less water was pressed into a block. In either the pressed or poured case, a decorative stone veneer was produced having equivalent aesthetic characteristics as commercially available stone veneer. A garden stepping stone was also produced.

Example 4

In this example, one five-gallon bucket of the by-product was mixed with one-half of a five-gallon bucket of Portland cement. One 20 ounce (570 gm.) cup full of glass fiber reinforcement was added to that mixture. In addition, 20 ounces (570 gm.) of commercially available concrete dye was added to the mixture. After mixing in the cement mixer, the mixture was dumped into a decorative stone veneer mold and pressed by hand. The water content was increased and the mixture was poured into a mold. In either case, a decorative stone veneer was produced having equivalent aesthetic and functional characteristics as commercially available stone veneer.

TABLE 2 lists the equivalent oxide constituents of the decorative stone determined by atomic absorption spectroscopy.

TABLE 2

| PRIMARY COMPOSITION | (%) |
| --- | --- |
| Calcium, CaO | 47 |
| Sulfate, $SO_3$ | 32 |

TABLE 2-continued

| PRIMARY COMPOSITION | (%) |
| --- | --- |
| Loss on Ignition LOI | 9 |
| Silicon, $SiO_2$ | 7 |
| Iron, $Fe_2O_3$ | 2 |
| Magnesium, MgO | 1 |
| Aluminum, $Al_2O_3$ | 1 |
| Potassium, $K_2O$ | 1 |

Example 5

In this example, one five-gallon bucket of the by-product (about 55 lbs. (about 25 kg).) was mixed in a cement mixer with one-half of a five-gallon bucket of Portland cement (about 25 lbs. (about 11 kg)) and a 20 ounce (570 gm.) cup full of glass fiber reinforcement. The resulting mixture was pressed into a block and allowed to dry and harden. The final block dimensions were 8⅝ inches (20 centimeters) by 4⅛ inches (20 centimeters) by 3⅞ inches (20 centimeters). The block weighed about three pounds. By comparison, a commercially available cement block measuring 7⅝ inches (20 centimeters) by 3⅝ inches (20 centimeters) by 2¼ inches (10 centimeters) weighs about four pounds.

TABLE 3 lists the equivalent oxide constituents of the block determined by atomic absorption spectroscopy.

TABLE 3

| PRIMARY COMPOSITION | (%) |
| --- | --- |
| Calcium, CaO | 43 |
| Silicon, $SiO_2$ | 15 |
| Loss on Ignition LOI | 13 |
| Sulfate, $SO_3$ | 9 |
| Iron, $Fe_2O_3$ | 9 |
| Magnesium, MgO | 4 |
| Carbonate | 3 |
| Aluminum, $Al_2O_3$ | 3 |
| Potassium, $K_2O$ | 1 |

Example 6

In this example, the block of Example 5 was heated to about 365° F. and held at that temperature for about two hours. The final weight of the block was two pounds. To demonstrate the fire resistance of the material, a propane torch was positioned such that the flame impinged on the surface of the block for about two minutes. The block turned orange at the point of flame impingement. The block did not crack or spall. Following the removal of the propane torch, the surface of the block was immediately (less than about 10 seconds) cool enough to touch without injury or pain.

Example 7

In this example, one five-gallon bucket of the by-product was mixed in a cement mixer with one-half of a five-gallon bucket of Portland cement and a 20 ounce (570 gm.) cup full of glass fiber reinforcement. The resulting mixture was formed into a sheet similar to a sheet of drywall and allowed to dry and harden. The sheet was about 4 feet (about 1.2 meters) by 8 feet (2.4 meters) by ⅝ inch (20 centimeters) thick. The sheet of the mixture was attached, like a sheet of drywall, to wooden two-by-fours. A flame from a propane torch was directed onto the sheet. As with the previous examples, the manufactured product did not appear to deteriorate due to the heat or from contact with the flames from the torch. Applicant also noted that the two by fours showed no sign of being burnt.

Example 8

In this example, one five-gallon bucket of gypsum was mixed with one-half of a five-gallon bucket of kiln-dried by-product (at about 365° F. (about 190° C.) for between about 1 and 2 hours) and that mixture was mixed with one five-gallon bucket of Portland cement. The one-half of a five-gallon bucket of kiln-dried by-product weighed about 13.75 lbs (about 6.25 kg). The mixture was poured into a series of 20 ounce (570 gm.) plastic cups. Water was added to the cups without mixing. Following a five to ten minute period of time, the mixture had hardened. Once exposed to water the mixture hardens but does not shrink. Applications include those that are similar to application for hydraulic grouts and mortars. An aggregate, such as washed #57 stone (0.25 inch (0.64 centimeter) to 0.75 inch (1.9 centimeters) washed aggregate) of about 10 wt. %, may be mixed into the mixture for additional structural strength.

Example 9

In this example, one five-gallon bucket of by-product, one five-gallon bucket of flyash, one-half of a five-gallon bucket of Portland cement, and one 20 ounce (570 gm.) cup of concrete fiber mesh were mixed in the cement mixer. Applications for this mixture include any number of structural products including, but not limited to, sheet, block, brick, synthetic stone, and sheets of drywall. Other applications include those which require some fire protection. The mixture and bulk products of the mixture were heated to at least 365° F. (190° C.). Both the heat treated parts and unheated mixtures exhibit exceptional fire resistance as described in Example 6 above. Therefore, applications, which by code or regulation require some fire resistance, such as coating structural steel, may benefit from the fire resistance that the mixture exhibits. The mixtures include formed components which, when assembled, enclose steel girders and posts. Alternatively, the mixture may be gunned similar to a commercially available gunning mixture onto the steel girder or surface of a steel post.

TABLE 4 lists the equivalent oxide constituents of the mixture as determined by atomic absorption spectroscopy.

TABLE 4

| PRIMARY COMPOSITION | (%) |
| --- | --- |
| Calcium, CaO | 38 |
| Sulfate, $SO_3$ | 27 |
| Silicon, $SiO_2$ | 14 |
| Loss on Ignition LOI | 7 |
| Iron, $Fe_2O_3$ | 7 |
| Aluminum, $Al_2O_3$ | 5 |
| Magnesium, MgO | 1 |
| Potassium, $K_2O$ | 1 |

Example 10

In this example, one five-gallon bucket of the by-product, one half of a five-gallon bucket of Portland cement, and one five-gallon bucket of bottom ash were mixed in the cement mixer. About 20 ounces (about 570 gm.) of fiber was added to the mixture. A variety of structural products including bricks, blocks, stone veneer, and stepping stone were pressed or poured from the mixture. Each component exhibited fire resistance, as described in Example 6 above.

TABLE 5 lists the equivalent oxide constituents of the mixture determined by atomic absorption spectroscopy.

TABLE 5

| PRIMARY COMPOSITION | (%) |
| --- | --- |
| Calcium, CaO | 37 |
| Silicon, $SiO_2$ | 18 |
| Sulfate, $SO_3$ | 15 |
| Iron, $Fe_2O_3$ | 11 |
| Loss on Ignition LOI | 8 |
| Magnesium, MgO | 5 |
| Aluminum, $Al_2O_3$ | 5 |
| Potassium, $K_2O$ | 1 |

Example 11

In this example, one five-gallon bucket of the by-product, one-half of a five-gallon bucket of Portland cement, and two, 20 ounce (570 gm.) cups of concrete fiber mesh were mixed in the cement mixer. Similar to the above examples, this mixture was formed into a variety of structural products. In addition, the mixture may be gunned or pumped onto other products or formed into products, as described above.

TABLE 6 lists the equivalent oxide constituents of the mixture determined by atomic absorption spectroscopy.

TABLE 6

| PRIMARY COMPOSITION | (%) |
| --- | --- |
| Calcium, CaO | 42 |
| Sulfate, $SO_3$ | 15 |
| Silicon, $SiO_2$ | 14 |
| Loss on Ignition LOI | 12 |
| Magnesium, MgO | 5 |
| Iron, $Fe_2O_3$ | 5 |
| Carbonate, $CO_2$ | 3 |
| Aluminum, $Al_2O_3$ | 3 |
| Potassium, $K_2O$ | 1 |

Example 13

In another example, the by-product was initially in a bulk unformed state, such as a shovel full of material. While in that form, the by-product was heated to about 365° F. (about 190° C.) for about 2 hours. After cooling, the heat-treated by-product was placed in gasoline. The bulk by-product absorbed at least 50% of its weight in gasoline in about 10 minutes. While submerged, the by-product released bubbles. It appears that when the bubbles cease, the by-product is nearly at full of liquid. The by-product with absorbed gasoline was set on fire and burned for nearly an hour. The surface temperature of the by-product exceeded 750° F. (400° C.) (the maximum temperature recordable by the noncontact pyrometer). When the fuel was depleted and flames extinguished, the surface temperature 30 seconds after the burn ended was 170° F. (77° C.). After about 4 minutes the temperature was 140° F. (60° C.). The by-product appeared unaffected by the exposure to either the fuel or to the elevated temperatures. In one example, repetitive use of one chunk of bulk by-product turned its exterior surface black. The blacken surface was easily removed. By comparison, bulk heat-treated gypsum does not absorb gasoline.

Similarly, a brick formed from the by-product, but not heat treated, and weighing about 3 pounds (about 1.4 kg) was used to absorb 1 pound (0.45 kilogram) of diesel fuel oil in about 25 minutes. When the diesel fuel oil was ignited, the surface temperature of the brick exceeded 750° F. (400° C.) while the diesel fuel oil burned. The surface temperature immediately after the flames were extinguished was about 180° F. (about 82° C.) and dropped to about 160° F. (about 71° C.) after about 4 minutes.

Example 14

In another example, one five-gallon bucket of the by-product was mixed with one five-gallon bucket of human waste in a cement mixer to form artificial soil. The mixture was about 50/50 by volume. The resulting mixture was poured into a 13 inch (33 centimeters) by 24 inch (61 centimeters) wooden tray to a depth of about 6 inches (about 15 centimeters). Grass seed was distributed across the top of the artificial soil. The grass seed was a "Kentucky 31" mixture of blue grass, fescue, clover, and other seed. In normal environmental conditions, the grass seed germinated in about 2 days and was mowable within a week, thus representing a growth rate of about 5 to 6 inches (about 13 to 15 centimeters) per week. Potential applications include topsoil replacement in areas that lack sufficient soil quantity or quality of soil, such as around new construction.

TABLE 6 lists the equivalent oxide constituents of the artificial soil determined by atomic absorption spectroscopy.

TABLE 6

| PRIMARY COMPOSITION | (%) |
|---|---|
| Loss on Ignition LOI | 27 |
| Sulfate, $SO_3$ | 27 |
| Calcium, CaO | 17 |
| Silicon, $SiO_2$ | 13 |
| Magnesium, MgO | 9 |
| Aluminum, $Al_2O_3$ | 4 |
| Phosphate, $P_2O_5$ | 1 |
| Choride, Cl— | 1 |
| Iron, $Fe_2O_3$ | 1 |

Example 15

In another example, a mixture of the by-product and animal waste, but with about 25% hydrated lime, also referred to as slaked lime, was mixed in a cement mixer. The hydrated lime is common additive used to control offensive odors. One five-gallon bucket of the by-product, one five-gallon bucket of human waste, and one-quarter of a five-gallon bucket of hydrated lime were introduced to the cement mixer. Following thorough mixing, the mixture was dumped into a wooden tray having dimension of about 13 inches (about 33 centimeters) by about 24 inches (about 61 centimeters). The artificial soil depth was again about 6 inches (about 15 centimeters) deep. Kentucky 31 grass seed was distributed over the surface of the soil. In normal environmental conditions, the grass seed germinated in about 2 days and was mowable within a week, thus representing a growth rate of about 5 to 6 inches (about 13 to 15 centimeters) per week.

TABLE 7 lists the equivalent oxide constituents of the artificial soil with hydrated lime determined by atomic absorption spectroscopy.

TABLE 7

| PRIMARY COMPOSITION | (%) |
|---|---|
| Loss on Ignition LOI | 27 |
| Sulfate, $SO_3$ | 25 |
| Calcium, CaO | 22 |
| Silicon, $SiO_2$ | 11 |
| Magnesium, MgO | 9 |
| Aluminum, $Al_2O_3$ | 3 |
| Phosphate, $P_2O_5$ | 1 |
| Choride, Cl— | 1 |
| Iron, $Fe_2O_3$ | 1 |

Example 16

In this example, one five-gallon bucket of gypsum was mixed with one five-gallon bucket of the by-product and one five-gallon bucket of dried human waste. The consistency appeared to be similar to that of moist dirt. The mixture was compressible, yet had a granular appearance following mixing. No hydrated lime was added though the mixture did not have an odor. This mixture may also be used as artificial topsoil with similar results as those illustrated in Examples 14 and 15.

In another embodiment, a composition for a manufactured component consists essentially of a by-product from a flue gas desulfurization process and a binder. As used herein, "consisting essentially of" means that no other elements are intentionally added to the mixture. However, the impurity content of other elements from the waste stream or the fabrication process may be contemplated.

While the present invention has been illustrated by the description of one or more embodiments thereof, and while the embodiments have been described in considerable detail, they are not intended to restrict or in any way limit the scope of the appended claims to such detail. Additional advantages, products and applications will readily appear to those skilled in the art. The invention is therefore not limited to the specific details, representative method and illustrative examples shown and described. Accordingly, departures may be made from such details without departing from the scope of the general inventive concept.

What is claimed is:

1. A method of making a manufactured product using a waste stream from a flue gas desulfurization process that has been depleted of gypsum so that the waste stream is enriched in a by-product, the method comprising:
   dewatering the gypsum-depleted waste stream to reduce a water content thereof and including removing particles of the by-product from the waste stream to form a sludge;
   forming the manufactured product by mixing the sludge with human waste, the manufactured product being in the form of an artificial soil; and
   spreading the artificial soil on a surface for exposure to the sun.

2. The method of claim 1, wherein removing includes removing particles having a diameter of 50 microns and less from the waste stream.

3. The method of claim 1, wherein removing includes forming the sludge with less than 75 wt. % gypsum and less than about 50 wt. % water.

4. The method of claim 1, wherein removing includes removing particles having a $d_{90}$ of less than 40 microns from the waste stream.

5. The method of claim 1, wherein removing includes removing particles having a $d_{50}$ of between about 3 microns and about 7 microns from the waste stream.

6. The method of claim 1, wherein removing includes forming a sludge that is less than 50 wt % gypsum.

7. The method of claim 1, wherein mixing further includes mixing a lime-containing compound with the artificial soil.

8. The method of claim 1, wherein mixing includes mixing about equal volume portions of human waste to sludge.

9. The method of claim 1, wherein, prior to spreading the artificial soil, the method includes heating the artificial soil.

10. The method of claim 1, further including:
spreading seeds over the surface of the artificial soil.

* * * * *